United States Patent Office 3,338,670
Patented Aug. 29, 1967

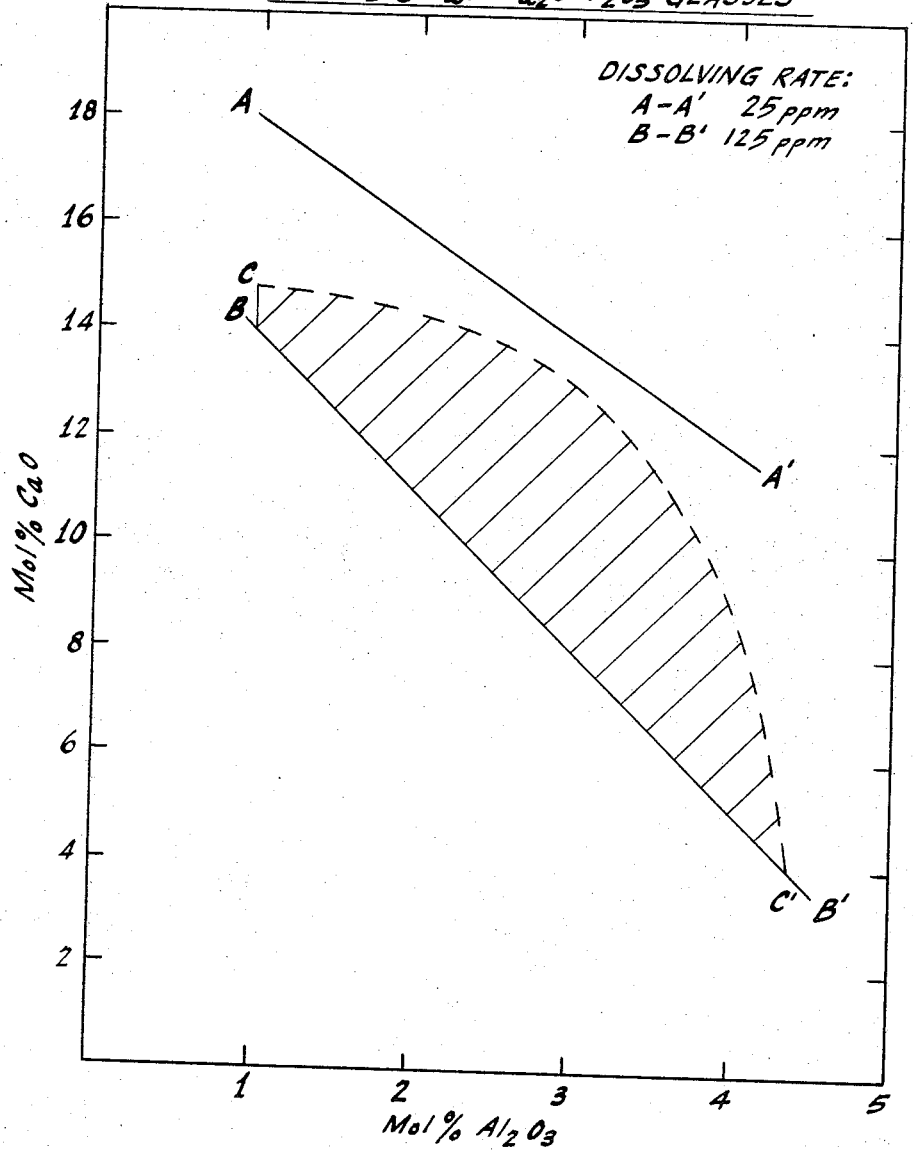

3,338,670
SLOWLY SOLUBLE PHOSPHATE GLASSES
Robert J. Fuchs, Clark, N.J., assignor to FMC Corporation, New York, N.Y., a corporation of Delaware
Filed Mar. 27, 1962, Ser. No. 182,870
1 Claim. (Cl. 23—106)

The present invention relates to a novel class of polyphosphate glasses having both metal-corrosion inhibiting properties and calcium sequestering properties when applied in aqueous solutions and more particularly to a class of polyphosphate glasses which has a controlled rate of dissolution in aqueous solutions while possessing materially lower fusion temperatures.

Polyphosphate glasses are currently used in aqueous solutions to inhibit corrosion of metals in contact with aqueous solutions and to inhibit hard water scale. The polyphosphates perform by sequestering the metal ions present in an aqueous system in the form of soluble complexes of the offending ions, thereby preventing them from forming scale on metal surfaces in contact with the aqueous system.

These glasses are produced by condensing molecules of orthophosphoric acid salts to form long-chained molecules having P–O–P bonds. The condensation is carried out by driving off molecular water at high temperatures from the appropriate orthophosphate salts.

Polyphosphate glasses produced from sodium salts of phosphoric acid, e.g. sodium hexametaphosphate, have been found to have good sequestration and other water-treating properties, but are objectionable because their dissolving rate in water is too high. Because of this high dissolving rate, water cannot be passed over a mass of the sodium polyphosphate glass in order to dissolve the minimum amount of glass necessary to effect the required water treatment. Instead, more glass is dissolved than is needed in the solution, resulting in the waste of material amounts of the sodium polyphosphate glass. A full review of the properties of these glasses and their objectionable dissolving rates is found in U.S. Patent 2,370,472, issued on Feb. 27, 1945 to Charles S. King.

In an effort to obtain polyphosphate glasses having both the desired sequestration and other water-treating properties, as well as good dissolving rates, prior workers have substituted calcium cations for the sodium contained in the glass. Typical compositions are described in U.S. Patent 2,539,305, issued Jan. 23, 1951 and U.S. Patent 2,601,395, issued June 24, 1952, both to George B. Hatch. Other workers have attempted to control the dissolving rate of these polyphosphate glasses by the substitution of either calcium oxide or aluminum oxide ($Al_2O_3$) for part of the $Na_2O$ which is present in the polyphosphate glasses. This is described in U.S. Patent 2,395,126, issued Feb. 19, 1946, and U.S. Patent 2,370,472, issued Feb. 27, 1945, both to Charles S. King.

While the above formulations have been successful in producing polyphosphate glasses having desirable water-treating properties and acceptable dissolving rates, they suffer the serious drawback of having extremely high fusion temperatures, i.e., on the order of about 1600° F. This high fusion temperature must be reached during the preparation of the melt before it can be quickly chilled to produce the polyphosphate glasses. Lower fusion temperatures are desirable in order to reduce the corrosive action of the molten phosphate on the brick lining employed in furnaces. In the normal production of phosphate glasses, the attack on furnace linings is severe, and increases with higher temperatures of the melt, necessitating periodic replacement of the furnace lining. Lower melt temperatures reduce the number of costly shutdowns and replacements which are required. Further, at these high temperatures, reduction of a few hundred degrees incurs a substantial saving in the fuel cost for producing the polyphosphate glasses. As a result, there has been a need for a formulation which has good water-treating properties, good dissolving rates, and which also has low fusion temperatures.

It is an object of the present invention to produce a polyphosphate glass having good water-treating properties, an acceptable dissolving rate, and substantially lower fusion temperature than has heretofore been obtained with similar polyphosphate glasses.

This and other objects will be apparent from the following disclosure.

It has been found unexpectedly that polyphosphate glasses containing about 46.5 to about 48.5 mole percent $P_2O_5$, about 35.5 to about 44.5 mole percent $Na_2O$, about 1 to about 4.25 mole percent $Al_2O_3$, and about 4 to 15 mole percent $CaO$ and falling within the shaded area of FIGURE I, have low fusion temperatures within the range of about 1148° F. to about 1382° F., while still possessing good water-treating properties and an acceptable dissolving rate.

The low fusion temperatures of these polyphosphate glasses is quite unexpected because the substitution of only small amounts of both calcium and aluminum cations for sodium ions have a pronounced effect on both the fusion temperature and the dissolving rate. In the instant polyphosphate glass, the substitution of a portion of the $Na_2O$ by small but specific amounts of both $CaO$ and $Al_2O_3$ produces a glass having not only a lower fusion temperature, but one which retains the preferred dissolving rate and water-treating properties.

The preparation of the present polyphosphate glasses is carried out by chemical reaction of basic inorganic salts or oxides containing suitable cations, e.g., alkali metals such as sodium, potassium and others, with a simple acidic phosphate. The alkali metal salts should be those which provide a volatile anion such as hydroxides, carbonates, etc. Alkali metal oxides can also be employed. The acidic phosphate should provide a volatile cation as do ammonium or dihydrogen phosphate, phosphoric acid, etc. After adjustment of the alkali metal to phosphorus ratio in the reaction mass, it is heated to the fusion temperature and a clear, transparent molten mass is obtained. This molten mass is rapidly chilled by well-known means. For example, the molten mass might be poured onto cold surfaces, such as water-cooled pans or trays. This solidified mass is crushed or ground to a desired size and packed in air-tight containers.

The $P_2O_5$ content of the instant glasses is maintained within a narrow range of about 46.5 to 48.5 mole percent, in order to obtain a polyphosphate glass which has the desirable water-treating properties. If the $P_2O_5$ content of the glass is increased substantially, either a very long chain or a branch chain glass is obtained. These glasses are to be avoided because they have poor corrosion inhibiting and dispersing properties. On the other hand, if the $P_2O_5$ content is decreased substantially, a very short chain glass or pyrophosphate is obtained having poor stability in use.

The present polyphosphate glasses are employed in amounts of about 1 part to about 125 parts per million of solution. At these concentrations, the polyphosphate glasses inhibit the corrosion of metal which is in contact with the aqueous solution. In addition, because of their sequestering action, the polyphosphate glasses inhibit calcium scale formation on metal surfaces which are immersed in the aqueous solution. These polyphosphate glasses also are effective in inhibiting the red color which is found in some waters due to high concentrations of iron. It has been found that the polyphosphate glasses at these concentrations are effective in inhibiting the iron from interfering in chemical treating operations and other applications.

The invention will now be described with reference to the attached drawing. In this drawing, polyphosphate glasses containing about 47.5 mole percent $P_2O_5$ are represented having varying amounts of calcium oxide and aluminum oxide. The mole percent $Na_2O$ is found by taking the difference between 100 and the sum of the mole percents of $P_2O_5$, CaO and $Al_2O_3$. In the drawing, lines A, A' and B, B' represent the limits on the dissolving rate for an acceptable commercial glassy polyphosphate. The line A,A' represents dissolving rates of about 25 parts per million, while line B, B' represents dissolving rates of about 125 parts per million.

The dissolving rate is calculated by placing 100 grams of the glassy polyphosphate having a particle size of between 8 and 20 mesh, in a liter of water at 20° C. The mixture is stirred for 10 minutes at 500 r.p.m. with a glass, paddle-type, four-blade stirrer, maintained within one-half inch of the base of the vessel. An aliquot of the filtrate is then analyzed for $P_2O_5$ content by the method of Martin and Doty, Anal. Chem., vol. 21, page 960 (1949). Glasses which are dissolved in the amount of about 25 to 125 parts per million, i.e., milligrams of polyphosphate glass, are considered acceptable. The term, "dissolving rate," as employed in the specification and claims, refers to the above test method for determining the rate at which the phosphate glasses dissolve in water.

Line C, C' represents the fusion temperature of the glasses, having the proportions of CaO and $Al_2O_3$ shown in the ordinate and abscissa, respectively. Mixtures of these ingredients falling above line C, C' have fusion temperatures which are above about 1380° F. Accordingly, the shaded area of the figure represents the desirable glassy compositions which have desirably low fusion temperatures, i.e., fall below line C, C', and have suitable dissolving rates, i.e., fall between lines A, A' and B, B'.

The following example is presented by way of illustration only and is not deemed to be limiting to the present invention.

*Example I*

A series of phosphate glasses was made up by mixing together soda ash (sodium carbonate) with 85% phosphoric acid in an aqueous solution and adding calcium carbonate and alumina. The ingredients were added in the amounts necessary to give the mole percent compositions listed in Table 1. The solutions were evaporated to dryness and the resultant mixtures were melted at their fusion temperatures. The molten masses were then poured onto a stainless steel water-cooled tray and the resultant glass crushed to yield particle sizes of between 8 and 20 mesh. A portion of these products was tested to determine the dissolving rate. This was done by placing 100 grams of the glassy polyphosphates in a liter of water at 20° C. This mixture is stirred for 10 minutes at 500 r.p.m. with a glass, paddle-type, four-blade stirrer maintained within one-half inch from the base of the vessel. An aliquot of each filtrate is then analyzed for $P_2O_5$ content by the method of Martin and Doty, Anal. Chem., vol. 21, page 960 (1949). A sample of each of the phosphate glasses was tested to determine the fusion temperature. This was done by heating the crushed phosphate glasses in a platinum crucible held in a muffle furnace. A thermocouple immersed within the glassy phosphate mixture was used to determine the fusion temperature of the sample. Both the fusion temperature and the dissolving rate of the glassy phosphate are reported in the table.

TABLE

| Glass No. | Mole Percent Composition | | | | Fusion Temp., °F. | Dissolving Rate [1] p.p.m. Glass |
|---|---|---|---|---|---|---|
| | $Al_2O_3$ | CaO | $Na_2O$ | $P_2O_5$ | | |
| 1 | 0.5 | 10.5 | 41.5 | 47.5 | 1,220 | 2,500 |
| 2 | 1 | 8 | 43.5 | 47.5 | 1,256 | 1,800 |
| 3 | 1 | 8.5 | 43 | 47.5 | 1,346 | 1,600 |
| 4 | 1 | 9.5 | 42 | 47.5 | 1,238 | 1,080 |
| 5 | 1 | 9.5 | 41 | 48.5 | 1,310 | 1,070 |
| 6 | 1 | 10 | 42.5 | 46.5 | 1,346 | 990 |
| 7 | 1 | 10 | 41.5 | 47.5 | 1,292 | 690 |
| 8 | 1 | 10 | 40.5 | 48.5 | 1,292 | 610 |
| 9 | 1 | 13 | 39.5 | 46.5 | 1,256 | 205 |
| 10 | 1 | 13 | 37.5 | 48.5 | 1,346 | 178 |
| 11 | 2 | 9 | 41.5 | 47.5 | 1,202 | 260 |
| 12 | 2 | 11 | 39.5 | 47.5 | 1,292 | 82 |
| 13 | 2 | 12 | 38.5 | 47.5 | 1,220 | 53 |
| 14 | 2 | 14 | 36.5 | 47.5 | 1,346 | 65 |
| 15 | 2 | 11 | 40.5 | 46.5 | 1,148 | 125 |
| 16 | 2 | 11 | 38.5 | 48.5 | 1,310 | 125 |
| 17 | 3 | 6 | 43.5 | 47.5 | 1,310 | 150 |
| 18 | 4 | 0 | 48.5 | 47.5 | 1,310 | 2,700 |
| 19 | 4 | 3 | 45.5 | 47.5 | 1,238 | 240 |
| 20 | 4 | 5 | 43.5 | 47.5 | 1,238 | 92 |
| 21 | 4 | 7 | 41.5 | 47.5 | 1,310 | 52 |
| 22 | 4 | 10 | 38.5 | 47.5 | 1,472 | 37 |
| 23 | 3 | 8 | 41.5 | 47.5 | 1,310 | 123 |
| 24 | 3 | 11 | 38.5 | 47.5 | 1,346 | 38 |
| 25 | 3 | 15 | 34.5 | 47.5 | 1,490 | 28 |
| 26 | 5 | 0 | 45 | 50 | 1,580 | 510 |
| 27 | 7 | 0 | 45.5 | 47.5 | 1,508 | 65 |

[1] Amount dissolved in 10 minutes under standard test conditions; p.p.m.=milligrams of dissolved glass per liter.

Glass numbers 12, 13, 14, 15, 16, 20, 21, 23 and 24 have both acceptable fusion temperatures and dissolving rates. The proportion of CaO and $Al_2O_3$ in the above acceptable glasses all fall within the shaded area defined in the attached drawing. From the above results, it can readily be observed that the amounts of calcium oxide and aluminum oxide are quite critical if acceptable glasses are to be obtained. This is especially noticeable in the case of the aluminum oxide additive where extremely small amounts have a material effect on both the solubility and the fusion temperature.

While the calcium and aluminum values in the above examples were added in the form of calcium oxide and alumina, respectively, it is to be understood that salts having these metal cations and volatile anions can also be employed to effect the same result. Accordingly, the present invention is not limited to the inclusion of calcium and aluminum by the addition of calcium oxide and aluminum oxide, respectively.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claim, the invention may be practiced by those skilled in the art, and having the benefit of this disclosure, otherwise than as specifically described and exemplified herein.

What is claimed is:

A glassy polyphosphate composition consisting essentially of from about 46.5 to about 48.5 mole percent $P_2O_5$, from about 35.5 to about 44.5 mole percent $Na_2O$, from about 1 to about 4.25 mole percent $Al_2O_3$, and from about 4 to about 15 mole percent CaO, said composition having a fusion temperature below about 1380° F. and a "dissolving rate" in water of between 25 and 125 milligrams per liter.

References Cited
UNITED STATES PATENTS

| | | | |
|---|---|---|---|
| 2,174,614 | 10/1939 | Bornemann et al. | 23—106 |
| 2,296,716 | 9/1942 | Jelen | 23—106 |
| 2,848,299 | 8/1958 | Kahler et al. | 21—2.7 |
| 2,890,928 | 6/1959 | Osipowe | 21—2.7 |
| 3,248,234 | 4/1966 | Gordon | 106—47 |

OSCAR R. VERTIZ, *Primary Examiner.*

MORRIS WOLK, *Examiner.*

G. A. MENTIS, O. F. CRUTCHFIELD,
*Assistant Examiners.*